United States Patent
He et al.

(10) Patent No.: US 12,349,190 B2
(45) Date of Patent: Jul. 1, 2025

(54) UNLICENSED SPECTRUM FRAME BASED EQUIPMENT CHANNEL SENSING TECHNIQUES

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Jie Cui, San Jose, CA (US); Oghenekome Oteri, San Diego, CA (US); Sigen Ye, Whitehouse Station, NJ (US); Wei Zeng, Saratoga, CA (US); Weidong Yang, San Jose, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,314

(22) PCT Filed: Aug. 5, 2020

(86) PCT No.: PCT/CN2020/107217
§ 371 (c)(1),
(2) Date: Sep. 21, 2021

(87) PCT Pub. No.: WO2022/027369
PCT Pub. Date: Feb. 10, 2022

(65) Prior Publication Data
US 2023/0189334 A1    Jun. 15, 2023

(51) Int. Cl.
*H04W 74/0808*    (2024.01)
*H04W 72/56*    (2023.01)

(52) U.S. Cl.
CPC ....... *H04W 74/0808* (2013.01); *H04W 72/56* (2023.01)

(58) Field of Classification Search
CPC . H04W 74/0808; H04W 72/56; H04W 48/12; H04W 74/006
See application file for complete search history.

(56) References Cited

U.S. PATENT DOCUMENTS

| 2017/0230838 A1 | 8/2017 | Yerramalli |
| 2018/0110057 A1* | 4/2018 | Park ................. H04W 74/0808 |

(Continued)

FOREIGN PATENT DOCUMENTS

| CN | 107079494 A | 8/2017 |
| CN | 108605369 A | 9/2018 |

(Continued)

OTHER PUBLICATIONS

PCT Search Report dated Apr. 9, 2021 in connection with PCT Application No. PCT/CN2020/107217.

(Continued)

*Primary Examiner* — Pao Sinkantarakorn
*Assistant Examiner* — Kabir U Jahangir
(74) *Attorney, Agent, or Firm* — Eschweiler & Potashnik, LLC; Matthew W Glause (57) ABSTRACT

Methods, circuitries, and systems are provided for performing frame based equipment channel sensing in unlicensed spectrum. In one example, a user equipment (UE) device includes a processor configured to perform operations including receiving, from a base station (BS), a plurality of UE-Initiated channel occupancy time (COT) frame based equipment (FBE) configurations; performing UE-Initiated COT FBE channel sensing based on a selected one of the received plurality of UE-Initiated COT FBE configurations to acquire a COT; and transmitting data during the COT.

16 Claims, 6 Drawing Sheets

(56) References Cited

U.S. PATENT DOCUMENTS

| | | | |
|---|---|---|---|
| 2019/0215810 A1 | 7/2019 | Mu et al. | |
| 2019/0274054 A1* | 9/2019 | Salem | H04L 12/189 |
| 2019/0335456 A1 | 10/2019 | Yerramalli et al. | |
| 2020/0037354 A1 | 1/2020 | Li | |
| 2020/0053798 A1 | 2/2020 | Tsai et al. | |
| 2020/0322988 A1* | 10/2020 | Fisher-Jeffes | H04W 16/14 |
| 2021/0084683 A1* | 3/2021 | Li | H04W 74/0808 |
| 2022/0110152 A1* | 4/2022 | Lim | H04W 74/006 |
| 2022/0159723 A1* | 5/2022 | Jiang | H04W 74/0866 |
| 2022/0248466 A1* | 8/2022 | Fan | H04W 72/54 |
| 2022/0295575 A1* | 9/2022 | Sun | H04W 72/0446 |
| 2023/0035989 A1* | 2/2023 | Awadin | H04W 72/569 |
| 2023/0051760 A1* | 2/2023 | Xu | H04W 74/0808 |
| 2023/0199833 A1* | 6/2023 | Xu | H04W 74/0808 370/329 |
| 2023/0354275 A1* | 11/2023 | Moon | H04W 74/0808 |

FOREIGN PATENT DOCUMENTS

| | | |
|---|---|---|
| CN | 110710318 A | 1/2020 |
| CN | 110913488 A | 3/2020 |
| CN | 111148258 A | 5/2020 |
| CN | 111278056 A | 6/2020 |
| CN | 111435884 A | 7/2020 |
| WO | 2016071741 A1 | 12/2016 |
| WO | 2018184022 A1 | 10/2018 |
| WO | 2019184943 A1 | 10/2019 |
| WO | 2019214676 A1 | 11/2019 |
| WO | 2020027533 A1 | 2/2020 |
| WO | 2020030186 A1 | 2/2020 |
| WO | 2020125121 A1 | 6/2020 |
| WO | 2020133190 A1 | 7/2020 |

OTHER PUBLICATIONS

PCT Written Opinion dated Apr. 9, 2021 in connection with PCT Application No. PCT/CN2020/107217.
Huawei et al; Coexistence and Channel Access for NR Unlicensed Band Operations; 3GPP TSG RAN WG1; Meeting #99; R1-191186; Nov. 22, 2019.
Nokia wt al; "Summary of Email Discussion on URLLC/IIOT Operation Support in Unlicensed Spectrum"; 3GPP TSG-RAN; Meeting #88-e; RP-200802; Jul. 3, 2020.
PCT Search Report dated Apr. 9, 2021 in connection with PCT Application No. PCT/CN2020/107188.
PCT Written Opinion dated Apr. 9, 2021 in connection with PCT Application No. PCT/CN2020/107188.
3rd Generation Partnership Project; Technical Specification Group Radio Access Network; NR; Physical layer procedures for data (Release 16); 3GPP TS 38.214 V16.2.0; Jun. 2020.
3rd Generation Partnership Project; Technical Specification Group Radio Access Network; NR; Radio Resource Control (RRC) protocol specification (Release 16); 3GPP TS 38.331 V16.1.0; Jul. 2020.
U.S. Appl. No. 17/441,310, filed Sep. 21, 2021.
Non-Final Office Action dated Dec. 5, 2023 in connection with U.S. Appl. No. 17/441,310.
International Preliminary Report on Patentability dated Feb. 7, 2023 in connection with Application Serial No. PCT/CN2020/107188.
International Preliminary Report on Patentability dated Feb. 7, 2023 in connection with Application Serial No. PCT/CN2020/107217.
European Extended Search Report dated Jan. 24, 2024 in connection with Application Serial No. EP20948832.
Huawei, HiSilicon; "Coexistence and channel access for NR unlicensed band operations"; 3GPP TSG RAN WG1 Meeting #98bis; R1-1910045; Oct. 14, 2019.
Notice of Allowance dated May 20, 2024, For U.S. Appl. No. 17/441,310.
OPPO; "PDCCH enhancement for URLLC"; 7.2.5.1; Discussion and Decision; 3GPP TSG RAN WG1 #100bis; R1-2001773; E-Meeting, Apr. 20-30, 2020.
InterDigital Inc.; "PUSCH Enhancements for URLLC"; 7.2.5.3; Discussion and Decision; 3GPP TSG RAN WG1 #100bis; R1-2002305; e-Meeting, Apr. 20-30, 2020.
Qualcomm Incorporated; "Multi-TRP Enhancements"; 7.2.6.2; Discussion/Decision; 3GPP TSG RAN WG1 #101-e; R1-2004463; May 25-Jun. 5, 2020.
Huawei, HiSilicon; "Coexistence and channel access for NR unlicensed band operations"; 3GPP TSG RAN WG1 Meeting #98bis; R1-1910045; Oct. 18, 2019.
Chinese Office Action Search dated Oct. 30, 2024 in connection with Application No. 202080104251.8.

* cited by examiner

UNLICENSED SPECTRUM FRAME BASED EQUIPMENT CHANNEL SENSING TECHNIQUES

REFERENCE TO RELATED APPLICATIONS

This application is a National Phase entry application of International Patent Application No. PCT/CN2020/107217 filed Aug. 5, 2020, entitled "UNLICENSED SPECTRUM FRAME BASED EQUIPMENT CHANNEL SENSING TECHNIQUES", the contents of which are herein incorporated by reference in their entirety.

BACKGROUND

In unlicensed spectrum, devices seeking to transmit first perform a clear channel assessment (CCA) process to ensure that the intended channel is clear. The CCA process negatively impacts latency.

BRIEF DESCRIPTION OF THE DRAWINGS

Some examples of circuits, apparatuses and/or methods will be described in the following by way of example only. In this context, reference will be made to the accompanying figures.

DETAILED DESCRIPTION

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

To facilitate efficient and fair spectrum sharing in unlicensed spectrum, a dynamic sharing spectrum sharing mechanism called listen-before-talk (LBT) has been provided in Long Term Evolution Unlicensed (LTE-U) and New Radio Unlicensed (NR-U) communication systems. LBT is a contention-based protocol that allows many users to use the same radio channel without pre-coordination. There are two kinds of LBT mechanisms, which are frame based equipment (FBE) and load based equipment (LBE). In FBE, channel sensing is performed at fixed time instants by a device seeking to transmit on the channel. If the channel is busy, the device backs off for a fixed time period and senses the channel again after this period. In LBE, the device is able to sense the channel at any time and a random back-off period is used if the channel is found to be busy.

There are trade offs between these two LBT mechanisms. For example, LBE allows transmitters to contend for a channel as soon as the channel becomes idle, which tends to reduce latency. However, FBE is considered to be beneficial for NR-U networks because the fixed frame intervals can be defined to be the same as the NR licensed carrier's slot boundaries.

Figure 1:
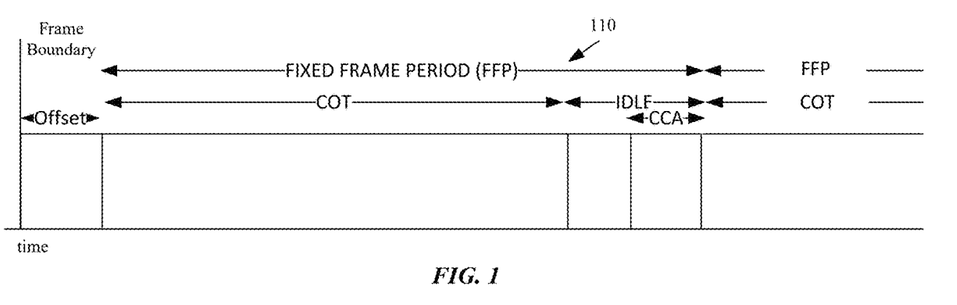
FIG. 1 illustrates an exemplary fixed frame period (FFP) of frame based equipment (FBE) type channel sensing.

FIG. 1 illustrates time domain resources 110 making up an exemplary fixed frame period (FFP) for FBE channel sensing. The FFP is configured by the gNB in a system information block (SIB) (e.g., SIB1). The maximum channel occupancy time (COT) (e.g., 95% of FFP) is defined by regulatory bodies and is encoded in the specification. The frame boundary is fixed to 10 ms in the New Radio specification. An FBE configuration specifies a back off period, as well as an offset (in ms) with respect to the frame boundary. An idle time period in each FFP corresponds to that portion of the FFP that is not occupied by the COT. Occurring during the idle time period are the fixed back off period and the CCA. The various parameters can be adjusted to take into account many factors, including channel loading and conditions as well as the priority of the data being transmitted. For the purposes of prioritization of channel access, a channel access priority class (CAPC) may be assigned to various transmissions based on, for example, a quality of service (QoS) associated with the transmission.

During the idle time period, the CCA is performed to contend for the COT in the following FFP. The time at which the CCA is performed within the idle time is determined by the fixed back off period. During the CCA, the transmitter senses an energy level in the channel and compares the energy level to a threshold to determine whether the channel is to be considered busy. If the sensed energy is lower than the threshold, the transmitter "acquires" or "initiates" the COT, meaning the transmitter takes control of the channel, for example by transmitting data or coordinating DL and UL transmission during the COT.

Figure 2:
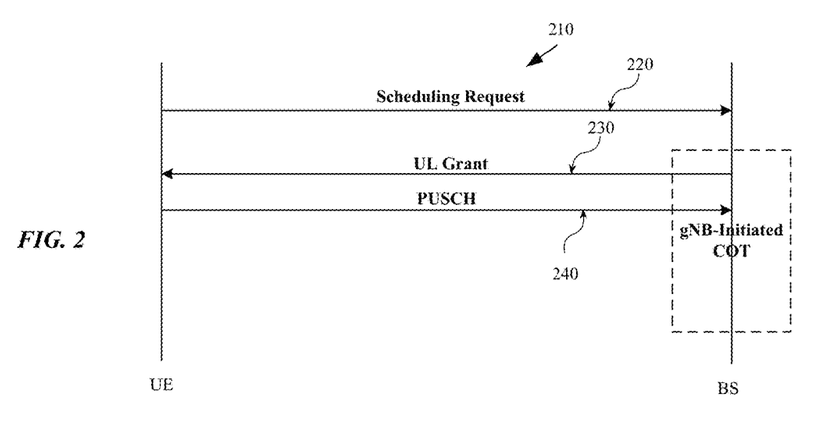
FIG. 2 illustrates a flow diagram of exemplary signaling that is performed between a user equipment (UE) device and a base station (BS) in which the BS performs an FBE channel sensing process to acquire a channel occupancy time (COT) for use by the UE to transmit data, in accordance with various aspects described.

NR-U Release 16 specifies that FBE sensing is restricted to the BS (e.g., gNB or other infrastructure equipment). This means that the UE does not perform FBE channel sensing to initiate uplink transmissions, but rather depends upon the BS to win the channel. As outlined in flow diagram 210 of FIG. 2, at 220 a UE seeking to transmit data in unlicensed spectrum transmits a scheduling request to the BS at 220. In response, the BS performs FBE channel sensing as outlined in FIG. 1 and eventually acquires a COT. During the COT, at 230 the BS transmits a UL grant to the UE specifying that the UL should be performed during a certain portion of the COT. At 240, the UE transmits UL data by way of the physical uplink shared channel (PUSCH) using the resources allocated in the UL grant. It can be seen that latency is increased because the UE waits for the BS to acquire the COT and transmit the UL grant before transmitting UL data. Further, in some use cases, the BS may be positioned in a higher traffic area than the UE, and as such may have more difficulty in winning the COT than the UE would.

Figure 3:
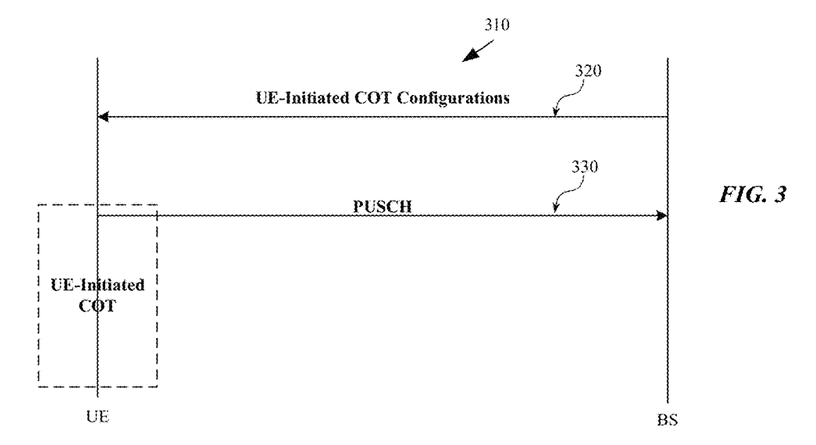
FIG. 3 illustrates a flow diagram of exemplary signaling that is performed between a user equipment (UE) device and a base station (BS) to configure the UE to perform an FBE channel sensing process to acquire a channel occupancy time (COT) for transmitting data, in accordance with various aspects described.

Described herein are systems, methods, and circuitries for supporting UE-initiated COT for FBE operation. Referring now to FIG. 3, a flow diagram 310 illustrates the BS transmitting a set of UE-Initiated FBE configurations to a UE at 320. The UE-Initiated FBE configurations include one or more FBE configurations that will allow the UE to perform FBE channel sensing. The UE-Initiated FBE configurations may include, for example, a period length (e.g., 10 ms), a back off period, as well as an offset (in ms) with respect to the frame boundary. When the UE has data to transmit, the UE performs the FBE channel sensing based on a selected UE-Initiated FBE configuration and, once a COT is acquired by the UE, the UE transmits the UL data via PUSCH at 330.

There are several techniques for signaling that the BS supports UE-Initiated COT and the UE-Initiated COT configurations. In one example, a System Information Block (SIB) broadcast by the BS (e.g., SIB1) may signal that the BS supports UE-Initiated COT. The UE-Initiated COT FBE configurations may also be transmitted in a SIB, which means that all UEs within a cell will share the same UE-Initiated COT FBE configuration, including fixed frame period and starting positions.

In another example, the UE-Initiated COT FBE configuration may be conveyed using UE-dedicated RRC signaling. This allows for UE-specific UE-Initiated COT FBE configurations based on application type (e.g., ultra-reliable low-latency communication (URLLC), enhanced mobile broadband (eMBB), or QoS requirement). One benefit to the UE-specific configuration is that it allows for limiting the number of UEs contending for the channel to those UEs transmitting high priority data.

Figure 4A:
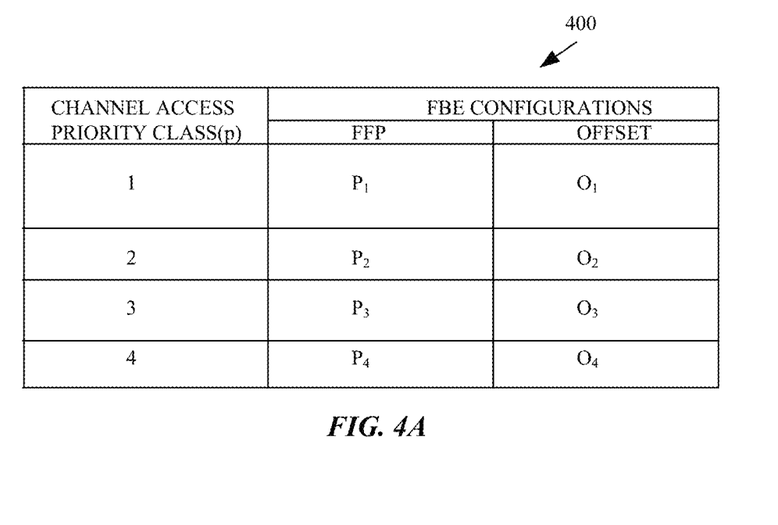
FIG. 4A illustrates an exemplary FBE Configuration table for configuring a UE to perform FBE channel sensing, in accordance with various aspects described.

FIG. 4A illustrates table 400 that outlines an exemplary UE-Initiated COT FBE configuration. The term "table" is used here conceptually, to describe any ordered manner of representing or communicating sets of parameter values. In the table representation, each parameter corresponds to a "column" and each set of parameter values are arranged in a "row" identified by some unique index value (not shown). The UE-Initiated COT FBE configuration includes multiple FBE configurations that each specify a fixed frame period P (e.g., in slots, symbols, or ms) and an offset value O. Each FBE configuration is mapped to a channel access priority class (CAPC). This allows the UE to select an FBE configuration based on the channel access priority class applicable to the unicast user plane data multiplexed in the PUSCH. In other examples other parameters may be used by the UE to select from amongst multiple FBE configurations. Alternatively, a single FBE configuration may be conveyed to the UE for use in sensing the channel regardless of data priority.

Figure 4B:
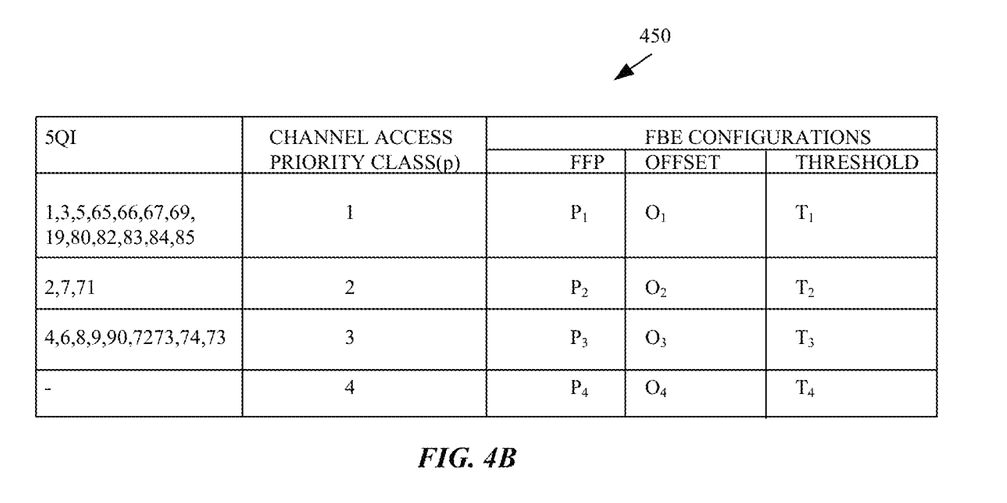
FIG. 4B illustrates an exemplary FBE Configuration table for configuring a UE to perform FBE channel sensing with different energy thresholds in different configurations, in accordance with various aspects described.

FIG. 4B illustrates a table 450 that outlines another exemplary UE-Initiated COT FBE configuration. Different 5QI indicators are mapped to the channel access priority classes so that the UE may select an FBE configuration based on either 5QI indicator or CAPC. The exemplary FBE configurations include, in addition to fixed frame period and offset, an energy threshold to be used in channel sensing. This allows for a larger threshold to be set for low-latency applications so that the channel is more likely to be won by a UE operating in the particular FBE configuration.

Figure 5A:
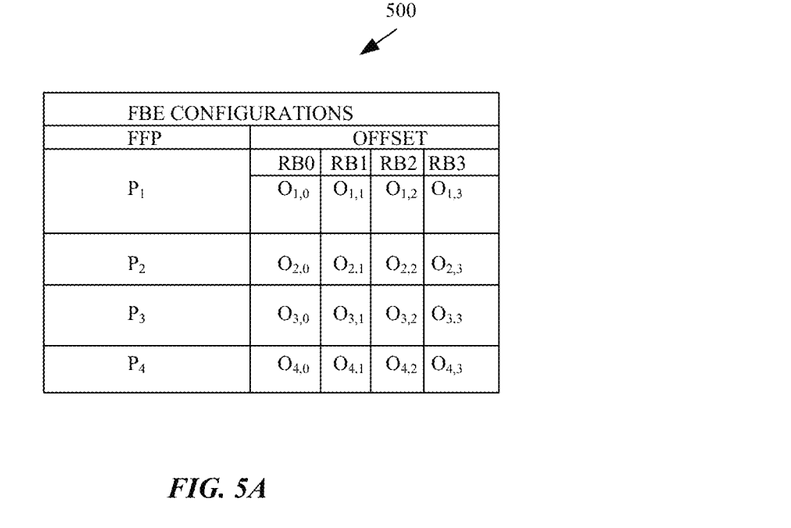
FIG. 5A illustrates an exemplary FBE Configuration table for configuring a UE to perform FBE channel sensing with offsets for different sets of resource blocks in a bandwidth portion, in accordance with various aspects described.
Figure 5B:
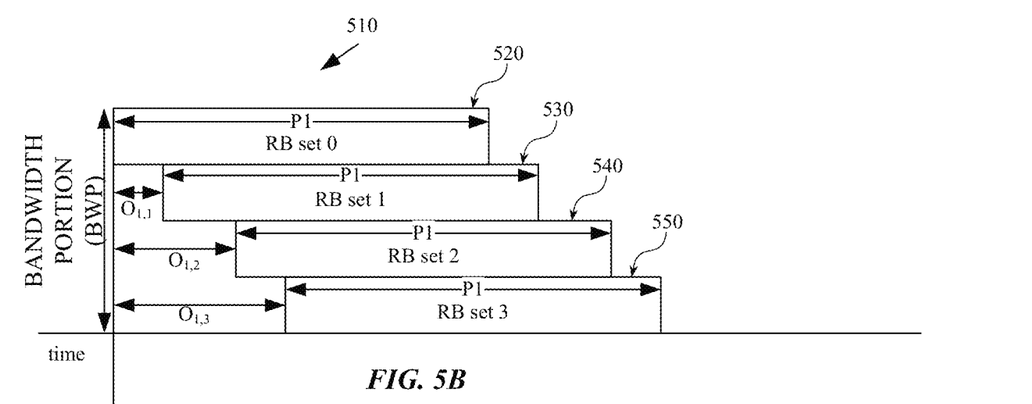
FIG. 5B illustrates a bandwidth portion in which different fixed frame periods are configured for different sets of resource blocks in a bandwidth portion, in accordance with various aspects described.

FIGS. 5A and 5B illustrate FBE configurations that allow for different FBE configurations for different resource block (RB) sets in a wideband bandwidth portion (e.g., 80 MHz BW with 4 RB sets each spanning 20 MHz). FIG. 5A illustrates an FBE configuration table in which separate (possibly different) offsets are configured for each of the different RBs. Time domain resource diagram 510 of FIG. 5B illustrates the FBE configuration for CAPC 1 assuming offset value $O_{1,0}$ is equal to zero. Providing separate FBE configurations for different RB sets in a wideband channel provides finer granularity for a UE or BS to access a shared channel and ultimately reduce latency. In other examples, different FBE configurations are provided depending on an LBT bandwidth (e.g., the bandwidth in which the UE performs LBT) to provide additional granularity.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. "Derive" should be construed to encompass computing or calculating the entity or value of the entity based on other quantities or entities. "Derive" should be construed to encompass any manner of deducing or identifying an entity or value of the entity.

Figure 6:
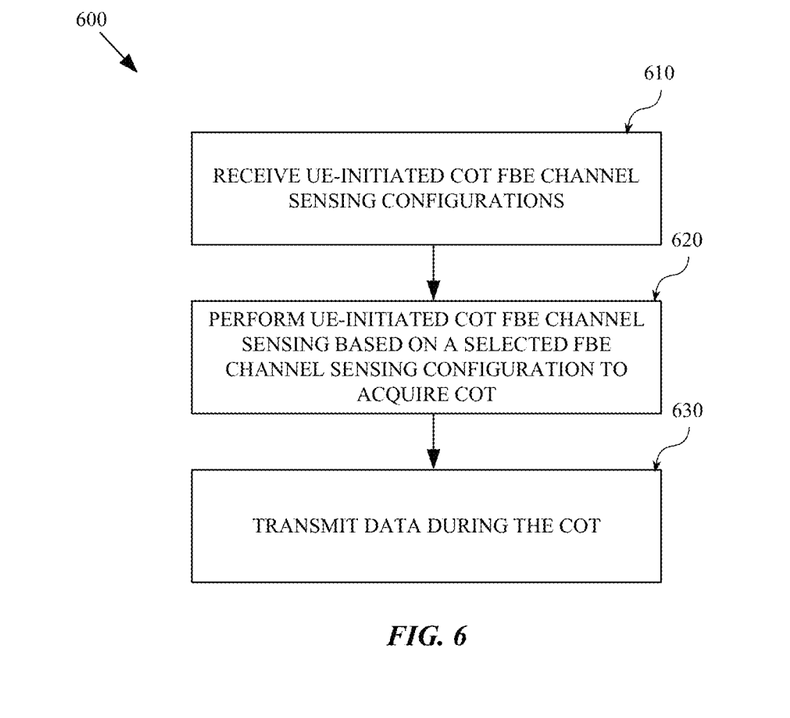
FIG. 6 illustrates a flow diagram of an exemplary method for configuring a UE to perform FBE channel sensing, in accordance with various aspects described.

FIG. 6 depicts a flow diagram outlining a method 600 to be performed by a UE. The method includes, at 610, receiving, from a base station (BS), a plurality of UE-Initiated channel occupancy time (COT) frame based equipment (FBE) channel sensing configurations. At 620, UE-Initiated COT FBE channel sensing is performed based on a selected one of the received plurality of UE-Initiated COT FBE configurations to acquire a COT. Data is transmitted during the COT at 630.

Figure 7:
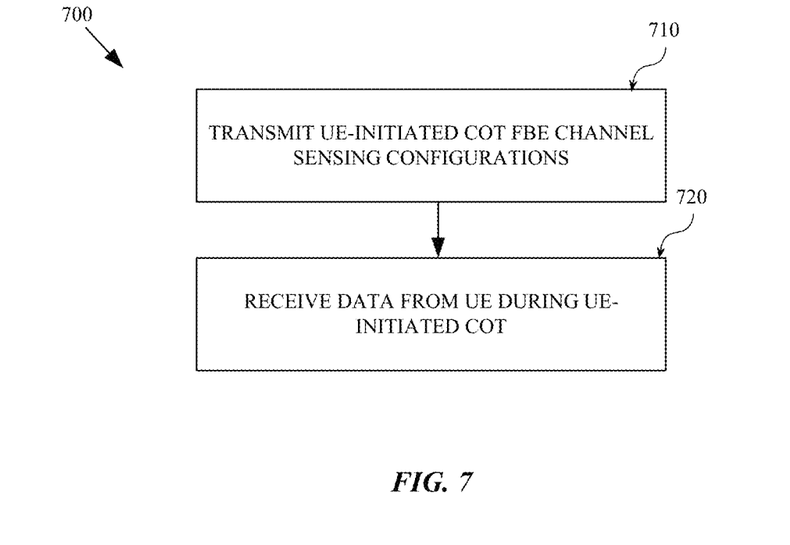
FIG. 7 illustrates a flow diagram of an exemplary method for configuring a UE to perform FBE channel sensing, in accordance with various aspects described.

FIG. 7 depicts a flow diagram outlining a method 700 to be performed by a BS. The method includes, at 710, transmitting, to a user equipment (UE) device, a plurality of UE-Initiated channel occupancy time (COT) frame based equipment (FBE) channel sensing configurations. The method includes, at 720, receiving data from the UE during a UE-Initiated COT.

Figure 8:
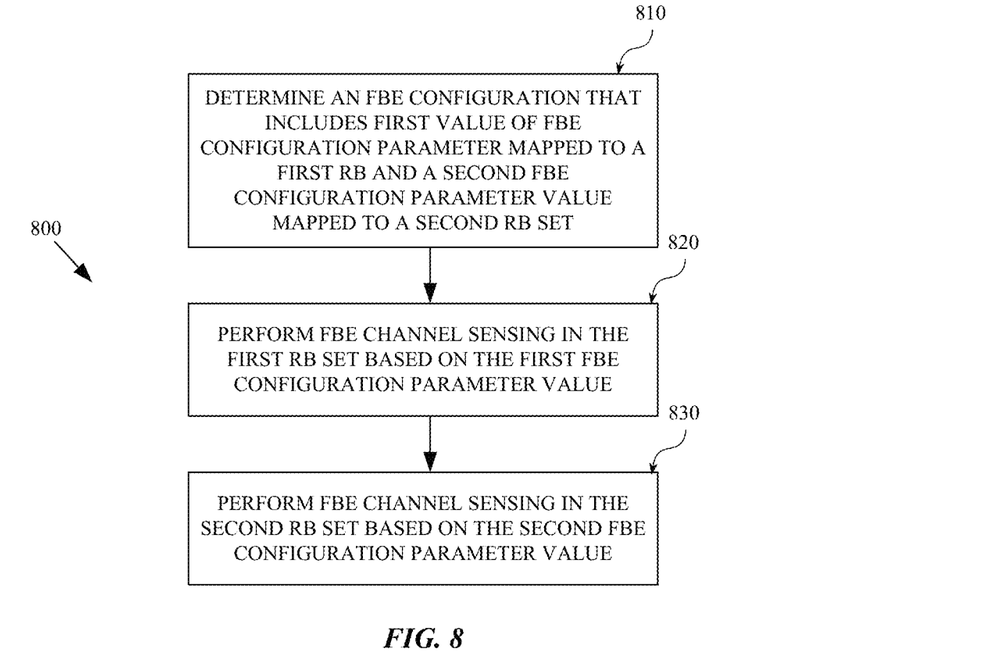
FIG. 8 illustrates a flow diagram of an exemplary method for configuring a device to perform FBE channel sensing on a per-resource block set basis, in accordance with various aspects described.

FIG. 8 depicts a flow diagram outlining a method 800 to be performed by a device (e.g., a UE or a BS). The method includes, at 810, determining an FBE configuration that includes a first value of an FBE configuration parameter mapped to a first resource block (RB) set and a second value of the FBE configuration parameter value mapped to a second RB set. At 820, FBE channel sensing is performed in the first RB set based on the first FBE configuration parameter value. At 830, FBE channel sensing is performed in the second RB set based on the second FBE configuration parameter value.

Figure 9:
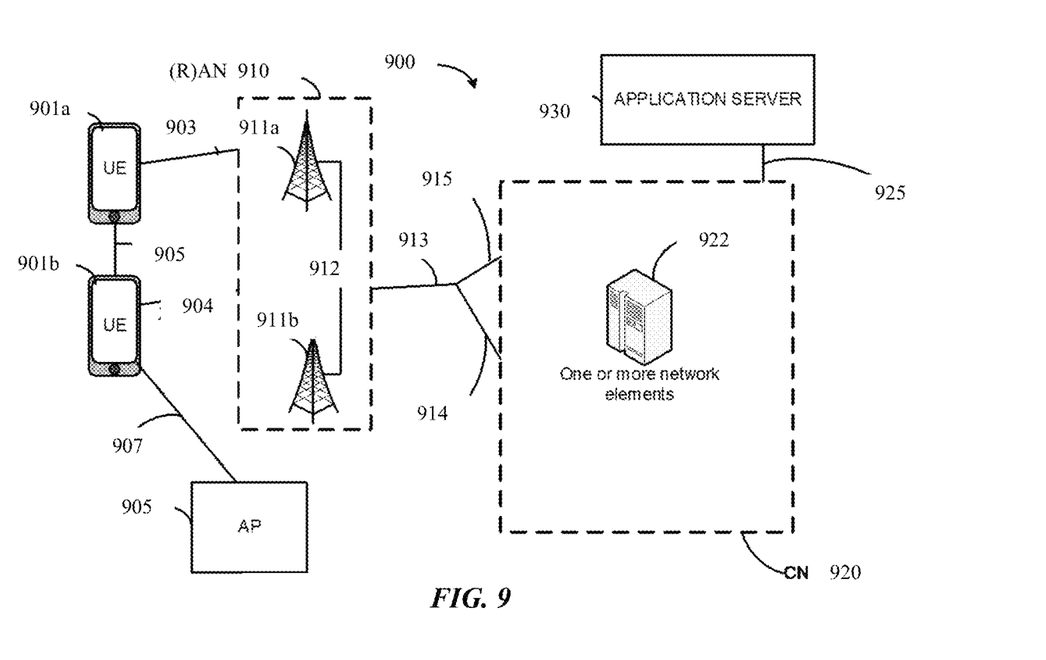
FIG. 9 illustrates an exemplary communication network, in accordance with various aspects disclosed.

FIG. 9 illustrates an example architecture of a system 900 of a communication network, in accordance with various embodiments. The following description is provided for an example system 900 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 702.16 protocols (e.g., WMAN, WiMAX, etc.), or the like.

As shown by FIG. 9, the system 900 includes UE 901a and UE 901b (collectively referred to as "UEs 901" or "UE 901"). In this example, UEs 901 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 901 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 may be configured to connect, for example, communicatively couple, with a RAN 910. In embodiments, the RAN 910 may be an NG RAN or a 5G RAN, an E-UTRAN, or a legacy RAN, such as a UTRAN or GERAN. As used herein, the term "NG RAN" or the like may refer to a RAN 910 that operates in an NR or 5G system 900, and the term "E-UTRAN" or the like may refer to a RAN 910 that operates in an LTE or 4G system 900. The UEs 901 utilize connections (or channels) 903 and 904, respectively, each of which comprises a physical communications interface or layer (discussed in further detail below).

In this example, the connections 903 and 904 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 901 may directly exchange communication data via a ProSe interface 905. The ProSe interface 905 may alternatively be referred to as a SL interface 905 and may comprise one or more logical channels, including but not limited to a PSCCH, a PSSCH, a PSDCH, and a PSBCH.

The UE 901b is shown to be configured to access an AP 906 (also referred to as "WLAN node 906," "WLAN 906," "WLAN Termination 906," "WT 906" or the like) via connection 907. The connection 907 can comprise a local wireless connection, such as a connection consistent with any IEEE 702.11 protocol, wherein the AP 906 would comprise a wireless fidelity (Wi-Fi®) router. In this example, the AP 906 is shown to be connected to the Internet without connecting to the core network of the wireless system (described in further detail below). In various embodiments, the UE 901b, RAN 910, and AP 906 may be configured to utilize LWA operation and/or LWIP operation. The LWA operation may involve the UE 901b in RRC_CONNECTED being configured by a RAN node 911a-b to utilize radio resources of LTE and WLAN. LWIP operation may involve the UE 901*b* using WLAN radio resources (e.g., connection 907) via IPsec protocol tunneling to authenticate and encrypt packets (e.g., IP packets) sent over the connection 907. IPsec tunneling may include encapsulating the entirety of original IP packets and adding a new packet header, thereby protecting the original header of the IP packets.

The RAN 910 can include one or more AN nodes or RAN nodes 911*a* and 911*b* (collectively referred to as "RAN nodes 911" or "RAN node 911") that enable the connections 903 and 904. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 911 that operates in an NR or 5G system 900 (for example, a gNB), and the term "E-UTRAN node" or the like may refer to a RAN node 911 that operates in an LTE or 4G system 900 (e.g., an eNB). According to various embodiments, the RAN nodes 911 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

According to various embodiments, the UEs 901 and the RAN nodes 911 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 901 and the RAN nodes 911 may operate using LAA, eLAA, and/or feLAA mechanisms. In these implementations, the UEs 901 and the RAN nodes 911 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 901 RAN nodes 911, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 702.11 technologies. WLAN employs a contention-based channel access mechanism, called CSMA/CA. Here, when a WLAN node (e.g., a mobile station (MS) such as UE 901, AP 906, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 8 microseconds ($\mu$s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 901 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 901. The PDCCH carries information about the transport format and resource allocations related to the PDSCH channel, among other things. It may also inform the UEs 901 about the transport format, resource allocation, and HARQ information related to the uplink shared channel. Typically, downlink scheduling (assigning control and shared channel resource blocks to the UE 901*b* within a cell) may be performed at any of the RAN nodes 911 based on channel quality information fed back from any of the UEs 901. The downlink resource assignment information may be sent on the PDCCH used for (e.g., assigned to) each of the UEs 901.

The RAN 910 is shown to be communicatively coupled to a core network—in this embodiment, core network (CN) 920. The CN 920 may comprise a plurality of network elements 922, which are configured to offer various data and telecommunications services to customers/subscribers (e.g., users of UEs 901) who are connected to the CN 920 via the RAN 910. The components of the CN 920 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 920 may be referred to as a network slice, and a logical instantiation of a portion of the CN 920 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
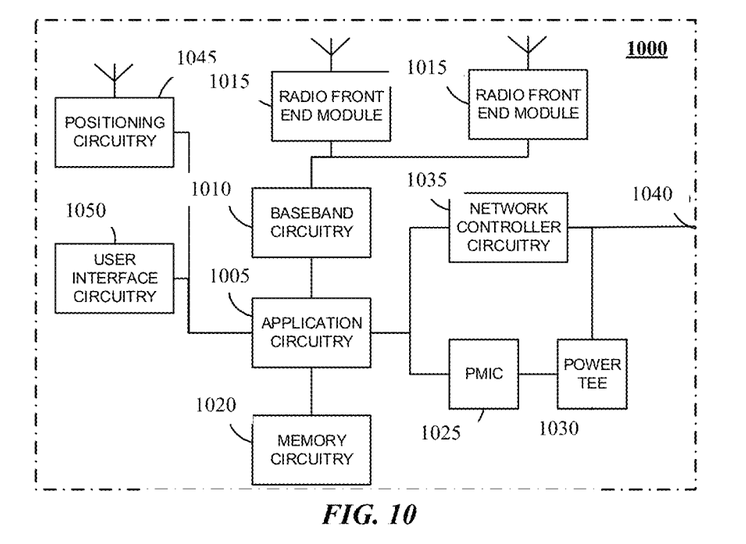
FIG. 10 illustrates an exemplary infrastructure equipment device (e.g., BS, eNB, gNB, and so on), in accordance with various aspects disclosed.

FIG. 10 illustrates an example of infrastructure equipment 1000 in accordance with various embodiments. The infrastructure equipment 1000 (or "system 1000") may be implemented as a base station, radio head, RAN node such as the RAN nodes 911 and/or AP 906 shown and described previously, application server(s) 930, and/or any other element/device discussed herein. In other examples, the system 1000 could be implemented in or by a UE.

The system 1000 includes application circuitry 1005, baseband circuitry 1010, one or more radio front end modules (RFEMs) 1015, memory circuitry 1020, power management integrated circuitry (PMIC) 1025, power tee circuitry 1030, network controller circuitry 1035, network interface connector 1040, satellite positioning circuitry 1045, and user interface 1050. In some embodiments, the device 1000 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1005 may comprise, or may be, a special-purpose processor/controller to operate according to the various embodiments herein. As examples, the processor(s) of application circuitry 1005 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1000 may not utilize application circuitry 1005, and instead may include a special-purpose processor/controller to process IP data received from an EPC or 5GC, for example.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an 12C interface, an SPI interface, point to point interfaces, and a power bus, among others.

Figure 11:
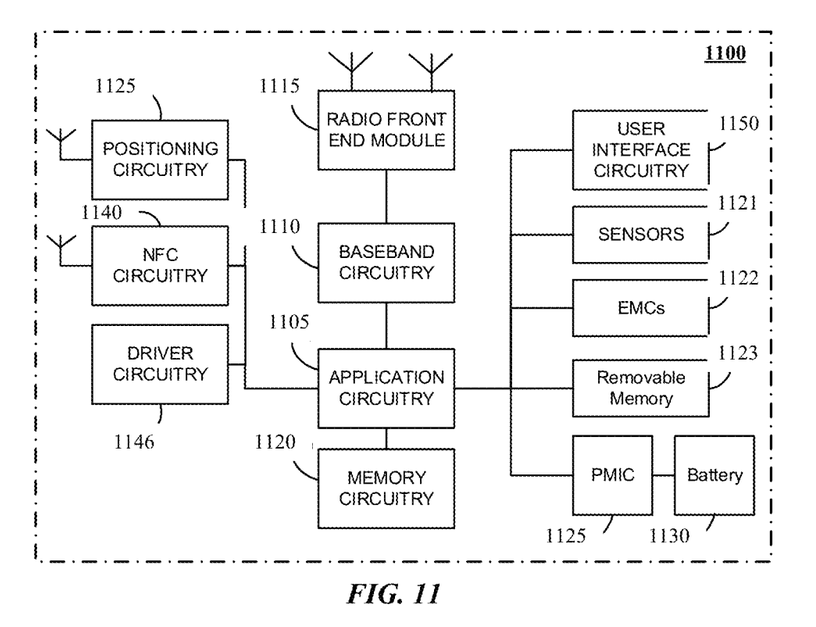
FIG. 11 illustrates an exemplary user equipment device (e.g., UE, wireless transmitting and receiving unit, and so on), in accordance with various aspects disclosed.

FIG. 11 illustrates an example of a platform 1100 (or "device 1100") in accordance with various embodiments. In embodiments, the computer platform 1100 may be suitable for use as UEs 901, application servers 930, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, 12C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 1105 may include a general or special purpose processor, such as an A-series processor (e.g., the A13 Bionic), available from Apple® Inc., Cupertino, CA or any other such processor. The processors of the application circuitry 1105 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1105 may be a part of a system on a chip (SoC) in which the application circuitry 1105 and other components are formed into a single integrated circuit, or a single package.

The baseband circuitry 1110 may be implemented, for example, as a solder-down substrate including one or more integrated circuits, a single packaged integrated circuit soldered to a main circuit board or a multi-chip module containing two or more integrated circuits.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

As used herein the term "apparatus" is to be construed as broadly encompassing circuitry, computer-readable medium storing computer executable instructions, a processor programmed to perform a set of functions, an integrated circuitry, a system-on-chip (SoC), a chip set, and so on.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

Examples

Example 1 is user equipment (UE) device including a processor configured to perform operations including receiving, from a base station (BS), a plurality of UE-Initiated channel occupancy time (COT) frame based equipment (FBE) configurations; performing UE-Initiated COT FBE channel sensing based on a selected one of the received plurality of UE-Initiated COT FBE configurations to acquire a COT; and transmitting data during the COT.

Example 2 includes the subject matter of example 1, including or omitting optional elements, wherein the processor is configured to perform operations including selecting one of the received plurality of UE-Initiated COT FBE configurations based on a channel access priority class (CAPC) associated with the data; and performing UE-Initiated COT FBE channel sensing based on the selected UE-Initiated COT FBE configuration.

Example 3 includes the subject matter of example 1, including or omitting optional elements, wherein the processor is configured to perform operations including identifying, in the selected UE-Initiated COT FBE configuration, an energy level threshold; and performing UE-Initiated COT FBE channel sensing based on the identified energy level threshold.

Example 4 includes the subject matter of example 1, including or omitting optional elements, wherein the processor is configured to perform operations including identifying, in the selected UE-Initiated COT FBE configuration, a first value of an FBE configuration parameter mapped to a first resource block (RB) set and a second value of the FBE configuration parameter value mapped to a second RB set; performing UE-Initiated COT FBE channel sensing in the first RB set based on the first FBE configuration parameter value; and performing UE-Initiated COT FBE channel sensing in the second RB set based on the second FBE configuration parameter value.

Example 5 includes the subject matter of example 4, including or omitting optional elements, wherein the FBE configuration parameter includes an offset value.

Example 6 includes the subject matter of examples 1-5, including or omitting optional elements, wherein the processor is configured to perform operations including receiving the plurality of UE-Initiated COT FBE configurations in a system information block.

Example 7 includes the subject matter of examples 1-5, including or omitting optional elements, wherein the processor is configured to perform operations including receiving the plurality of UE-Initiated COT FBE configurations in radio resource control (RRC) signaling dedicated to the UE.

Example 8 is a base station (BS), including a processor configured to perform operations including transmitting, to a user equipment (UE) device, a plurality of UE-Initiated channel occupancy time (COT) frame based equipment (FBE) configurations.

Example 9 includes the subject matter of example 8, including or omitting optional elements, wherein the processor is configured to perform operations including transmitting the plurality of UE-Initiated COT FBE configurations, wherein each UE-Initiated COT FBE configuration is associated with a channel access priority class (CAPC).

Example 10 includes the subject matter of example 8, including or omitting optional elements, wherein the processor is configured to perform operations including transmit the plurality of UE-Initiated COT FBE configurations, wherein each UE-Initiated COT FBE configuration includes an energy level threshold.

Example 11 includes the subject matter of example 8, including or omitting optional elements, wherein the processor is configured to perform operations including transmit the plurality of UE-Initiated COT FBE configurations, wherein each UE-Initiated COT FBE configuration includes a first value of an FBE configuration parameter mapped to a first resource block (RB) set and a second value of the FBE configuration parameter value mapped to a second RB set.

Example 12 includes the subject matter of example 11, including or omitting optional elements, wherein the FBE configuration parameter includes an offset value.

Example 13 includes the subject matter of examples 8-12, including or omitting optional elements, wherein the processor is configured to perform operations including transmitting the plurality of UE-Initiated COT FBE configurations in a system information block.

Example 14 includes the subject matter of examples 8-12, including or omitting optional elements, wherein the processor is configured to perform operations including transmit the plurality of UE-Initiated COT FBE configurations in radio resource control (RRC) signaling dedicated to the UE.

Example 15 is a wireless communication device, including a processor configured to perform operations including reading an FBE configuration that includes a first value of an FBE configuration parameter mapped to a first resource block (RB) set and a second value of the FBE configuration parameter value mapped to a second RB set; performing FBE channel sensing in the first RB set based on the first FBE configuration parameter value; and performing FBE channel sensing in the second RB set based on the second FBE configuration parameter value.

Example 16 includes the subject matter of example 15, including or omitting optional elements, wherein the FBE configuration parameter includes an offset value.

Example 17 includes the subject matter of example 15, including or omitting optional elements, wherein the FBE configuration includes a respective value for the FBE configuration parameter for each of four respective RB sets in an 80 MHz bandwidth portion.

Example 18 is a method, including receiving, from a base station (BS), a plurality of UE-Initiated channel occupancy time (COT) frame based equipment (FBE) configurations; performing UE-Initiated COT FBE channel sensing based on a selected one of the received plurality of UE-Initiated COT FBE configurations to acquire a COT; and transmitting data during the COT.

Example 19 includes the subject matter of example 18 including or omitting optional elements, including selecting one of the received plurality of UE-Initiated COT FBE configurations based on a channel access priority class (CAPC) associated with the data; and performing UE-Initiated COT FBE channel sensing based on the selected UE-Initiated COT FBE configuration.

Example 20 includes the subject matter of example 18 including or omitting optional elements, including identifying, in the selected UE-Initiated COT FBE configuration, an energy level threshold; and performing UE-Initiated COT FBE channel sensing based on the identified energy level threshold.

Example 21 includes the subject matter of example 18 including or omitting optional elements, including identifying, in the selected UE-Initiated COT FBE configuration, a first value of an FBE configuration parameter mapped to a first resource block (RB) set and a second value of the FBE configuration parameter value mapped to a second RB set; performing UE-Initiated COT FBE channel sensing in the first RB set based on the first FBE configuration parameter value; and performing UE-Initiated COT FBE channel sensing in the second RB set based on the second FBE configuration parameter value.

Example 22 includes the subject matter of example 21 including or omitting optional elements, wherein the FBE configuration parameter includes an offset value.

Example 23 includes the subject matter of examples 18-22 including or omitting optional elements, including receiving the plurality of UE-Initiated COT FBE configurations in a system information block.

Example 24 includes the subject matter of examples 18-22 including or omitting optional elements, including receiving the plurality of UE-Initiated COT FBE configurations in radio resource control (RRC) signaling dedicated to the UE.

Example 25 is a method, including transmitting, to a user equipment (UE) device, a plurality of UE-Initiated channel occupancy time (COT) frame based equipment (FBE) configurations; and receiving data from the UE during a UE-Initiated COT.

Example 26 includes the subject matter of example 25 including or omitting optional elements, including transmitting the plurality of UE-Initiated COT FBE configurations, wherein each UE-Initiated COT FBE configuration is associated with a channel access priority class (CAPC).

Example 27 includes the subject matter of example 25 including or omitting optional elements, including transmitting the plurality of UE-Initiated COT FBE configurations, wherein each UE-Initiated COT FBE configuration includes an energy level threshold.

Example 28 includes the subject matter of example 25 including or omitting optional elements, including transmitting the received plurality of UE-Initiated COT FBE configurations, wherein each UE-Initiated COT FBE configuration includes a first value of an FBE configuration parameter mapped to a first resource block (RB) set and a second value of the FBE configuration parameter value mapped to a second RB set.

Example 29 includes the subject matter of example 28 including or omitting optional elements, wherein the FBE configuration parameter includes an offset value.

Example 30 includes the subject matter of examples 25-29 including or omitting optional elements, including transmitting the plurality of UE-Initiated COT FBE configurations in a system information block.

Example 31 includes the subject matter of examples 25-29 including or omitting optional elements, including transmitting the plurality of UE-Initiated COT FBE configurations in radio resource control (RRC) signaling dedicated to the UE.

Example 32 is a method, including determining an FBE configuration that includes a first value of an FBE configuration parameter mapped to a first resource block (RB) set and a second value of the FBE configuration parameter value mapped to a second RB set; performing FBE channel sensing in the first RB set based on the first FBE configuration parameter value; and performing FBE channel sensing in the second RB set based on the second FBE configuration parameter value.

Example 33 includes the subject matter of example 32 including or omitting optional elements, wherein the FBE configuration parameter includes an offset value.

Example 34 includes the subject matter of example 32 including or omitting optional elements, wherein the FBE configuration includes a respective value for the FBE configuration parameter for each of four respective 20 MHz wide RB sets in an 80 MHz bandwidth portion.

Example 35 is a baseband processor configured to perform operations including receiving, from a base station (BS), a plurality of UE-Initiated channel occupancy time (COT) frame based equipment (FBE) channel sensing configurations; performing UE-Initiated COT FBE channel sensing based on a selected one of the received plurality of UE-Initiated COT FBE configurations to acquire a COT; and transmitting data during the COT.

Example 36 includes the subject matter of example 35 including or omitting optional elements, further configured to perform operations including selecting one of the received plurality of UE-Initiated COT FBE configurations based on a channel access priority class (CAPC) associated with the data; and performing UE-Initiated COT FBE channel sensing based on the selected UE-Initiated COT FBE configuration.

Example 37 includes the subject matter of example 35 including or omitting optional elements, further configured to perform operations including identifying, in the selected UE-Initiated COT FBE configuration, an energy level threshold; and performing UE-Initiated COT FBE channel sensing based on the identified energy level threshold.

Example 38 includes the subject matter of example 35 including or omitting optional elements, further configured to perform operations including identifying, in the selected UE-Initiated COT FBE configuration, a first value of an FBE configuration parameter mapped to a first resource block (RB) set and a second value of the FBE configuration parameter value mapped to a second RB set; performing UE-Initiated COT FBE channel sensing in the first RB set based on the first FBE configuration parameter value; and performing UE-Initiated COT FBE channel sensing in the second RB set based on the second FBE configuration parameter value.

Example 39 includes the subject matter of example 38 including or omitting optional elements, wherein the FBE configuration parameter includes an offset value.

Example 40 includes the subject matter of examples 35-39 including or omitting optional elements, further configured to perform operations including receiving the plurality of UE-Initiated COT FBE configurations in a system information block.

Example 41 includes the subject matter of examples 35-39 including or omitting optional elements, further configured to perform operations including receiving the plurality of UE-Initiated COT FBE configurations in radio resource control (RRC) signaling dedicated to the UE.

Example 42 is a baseband processor configured to perform operations including transmitting, to a user equipment (UE) device, a plurality of UE-Initiated channel occupancy time (COT) frame based equipment (FBE) channel sensing configurations; and receiving data from the UE during a UE-Initiated COT.

Example 43 includes the subject matter of example 42 including or omitting optional elements, further configured to perform operations including transmitting the plurality of UE-Initiated COT FBE configurations, wherein each UE-Initiated COT FBE configuration is associated with a channel access priority class (CAPC).

Example 44 includes the subject matter of example 42 including or omitting optional elements, further configured to perform operations including transmitting the plurality of UE-Initiated COT FBE configurations, wherein each UE-Initiated COT FBE configuration includes an energy level threshold.

Example 45 includes the subject matter of example 42 including or omitting optional elements, further configured to perform operations including transmitting the received plurality of UE-Initiated COT FBE configurations, wherein each UE-Initiated COT FBE configuration includes a first value of an FBE configuration parameter mapped to a first resource block (RB) set and a second value of the FBE configuration parameter value mapped to a second RB set.

Example 46 includes the subject matter of example 45 including or omitting optional elements, wherein the FBE configuration parameter includes an offset value.

Example 47 includes the subject matter of examples 42-46 including or omitting optional elements, further configured to perform operations including transmitting the plurality of UE-Initiated COT FBE configurations in a system information block.

Example 48 includes the subject matter of examples 42-46 including or omitting optional elements, further configured to perform operations including transmitting the plurality of UE-Initiated COT FBE configurations in radio resource control (RRC) signaling dedicated to the UE.

Example 49 is a baseband processor configured to perform operations including determining an FBE configuration that includes a first value of an FBE configuration parameter mapped to a first resource block (RB) set and a second value of the FBE configuration parameter value mapped to a second RB set; performing FBE channel sensing in the first RB set based on the first FBE configuration parameter value; and performing FBE channel sensing in the second RB set based on the second FBE configuration parameter value.

Example 50 includes the subject matter of example 49 including or omitting optional elements, wherein the FBE configuration parameter includes an offset value.

Example 52 includes the subject matter of example 49 including or omitting optional elements, wherein the FBE configuration includes a respective value for the FBE configuration parameter for each of four respective 20 MHz wide RB sets in an 80 MHz bandwidth portion.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor configured to perform operations comprising:
    receiving a first system information block (SIB1) indicating that a base station supports (UE)-Initiated channel occupancy time (COT);
    receiving, in radio resource control (RRC) signaling dedicated to a UE, a plurality of UE-Initiated COT frame based equipment (FBE) channel sensing configurations, wherein different UE-Initiated COT FBE channel sensing configurations of the plurality are associated with different listen-before-talk (LBT) bandwidths;
    in response to uplink data for transmission,
        selecting, based on a bandwidth in which the UE performs LBT, one of the received plurality of UE-Initiated COT FBE channel sensing configurations;
        controlling a transceiver to perform UE-Initiated COT FBE channel sensing based on the selected UE-Initiated COT FBE channel sensing configuration to acquire a COT; and
        controlling the transceiver to transmit the uplink data during the COT.

2. The baseband processor of claim 1, further configured to perform operations comprising:
    identifying, in the selected UE-Initiated COT FBE channel sensing configuration, an energy level threshold; and
    performing UE-Initiated COT FBE channel sensing based on the identified energy level threshold.

3. The baseband processor of claim 1, further configured to perform operations comprising:
    identifying, in the selected UE-Initiated COT FBE channel sensing configuration, a first value of an FBE configuration parameter mapped to a first resource block (RB) set and a second value of the FBE configuration parameter mapped to a second RB set; and
    based on a configured RB set, performing UE-Initiated COT FBE channel sensing in the first RB set based on the first FBE configuration parameter value or in the second RB set based on the second FBE configuration parameter value.

4. The baseband processor of claim 1, wherein each UE-Initiated COT FBE channel sensing configuration indicates an offset value.

5. The baseband processor of claim 1, wherein each UE-Initiated COT FBE channel sensing configuration indicates a fixed frame period value.

6. A baseband processor configured to perform operations comprising:
    controlling a transceiver to transmit a first system information block (SIB1) that indicates support for user equipment (UE)-Initiated channel occupancy time (COT); and
    user equipment (UE)-dedicated radio resource control (RRC) signaling indicative of a plurality of UE-Initiated COT frame based equipment (FBE) channel sensing configurations, wherein different UE-Initiated COT FBE channel sensing configurations of the plurality are associated with different channel access priority classes, different sets of 5G quality of service indicators (5QIs), and different listen-before-talk (LBT) bandwidths; and
    receiving data from the UE during a UE-Initiated COT.

7. The baseband processor of claim 6, further configured to perform operations comprising:
    monitoring for data from the UE during a configured UE-Initiated COT, wherein the UE-Initiated COT is not related to a UL grant.

8. The baseband processor of claim 6, wherein each UE-Initiated COT FBE channel sensing configuration includes an energy level threshold.

9. The baseband processor of claim 6, wherein each UE-Initiated COT FBE channel sensing configuration includes a first value of an FBE configuration parameter mapped to a first resource block (RB) set and a second value of the FBE configuration parameter mapped to a second RB set.

10. The baseband processor of claim 6, wherein each UE-Initiated COT FBE channel sensing configuration indicates an offset value.

11. The baseband processor of claim 6, wherein each UE-Initiated COT FBE channel sensing configuration indicates a fixed frame period value.

12. A user equipment (UE) comprising a memory to store information, and a baseband processor configured to, when executing instructions stored in the memory, cause the UE to:
    receive a first system information block (SIB1) indicating that a base station supports (UE)-Initiated channel occupancy time (COT);
    receive, in radio resource control (RRC) signaling dedicated to a UE, a plurality of UE-Initiated COT frame based equipment (FBE) channel sensing configurations, wherein different UE-Initiated COT FBE channel sensing configurations of the plurality are associated with different channel access priority classes (CAPCs), different 5G quality of service indicators (5QIs), and different listen-before-talk (LBT) bandwidths; and
    in response to uplink data for transmission,
        selecting, based on a CAPC or 5QI associated with the uplink data and a bandwidth in which the UE performs LBT, one of the received plurality of UE-Initiated COT FBE channel sensing configurations;
        controlling a transceiver to perform UE-Initiated COT FBE channel sensing based on the selected UE-Initiated COT FBE channel sensing configuration to acquire a COT; and
        controlling the transceiver to transmit the uplink data during the COT.

13. The UE of claim 12, wherein the baseband processor is further configured to perform operations comprising:
    identifying, in the selected UE-Initiated COT FBE channel sensing configuration, an energy level threshold; and
    performing UE-Initiated COT FBE channel sensing based on the identified energy level threshold.

14. The UE of claim 12, wherein the baseband processor is further configured to perform operations comprising:
    identifying, in the selected UE-Initiated COT FBE channel sensing configuration, a first value of an FBE configuration parameter mapped to a first resource block (RB) set and a second value of the FBE configuration parameter mapped to a second RB set; and
    based on a configured RB set, performing UE-Initiated COT FBE channel sensing in the first RB set based on the first FBE configuration parameter value or in the second RB set based on the second FBE configuration parameter value.

15. The UE of claim 12, wherein respective UE-Initiated COT FBE channel sensing configurations indicate an offset value.

16. The UE of claim 12, wherein respective UE-Initiated COT FBE channel sensing configurations indicate a fixed frame period value.

* * * * *